United States Patent
Banerjee

(10) Patent No.: US 9,075,810 B2
(45) Date of Patent: Jul. 7, 2015

(54) VOLUME AND PARTIAL VOLUME MERGE TO SYNCHRONIZE TO NON-HOMOGENEOUS DRIVE LAYOUTS

(75) Inventor: Amitrajit Banerjee, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 113 days.

(21) Appl. No.: 13/357,048

(22) Filed: Jan. 24, 2012

(65) Prior Publication Data

US 2013/0191345 A1 Jul. 25, 2013

(51) Int. Cl.
*G06F 17/30* (2006.01)
(52) U.S. Cl.
CPC ................... *G06F 17/3007* (2013.01)
(58) Field of Classification Search
CPC ............. G06F 17/30156; G06F 17/30159; G06F 3/0608; G06F 3/0641; G06F 2201/84; G06F 17/30088; G06F 11/1446; G06F 11/1453; G06F 3/067; G06F 11/1448; G06F 17/30067; G06F 11/1435; G06F 17/30174; G06F 67/1097; G06F 11/1464; G06F 11/3006; G06F 17/30575; G06F 3/0643; H04L 67/1097
USPC ......................... 707/641, 646, 649
See application file for complete search history.

(56) References Cited

U.S. PATENT DOCUMENTS

| | | | | |
|---|---|---|---|---|
| 5,819,296 A * | 10/1998 | Anderson et al. | ...... | 707/999.102 |
| 6,185,666 B1 * | 2/2001 | Murray et al. | ................ | 711/173 |
| 7,392,356 B1 * | 6/2008 | Hardman | ....................... | 711/162 |
| 7,475,098 B2 * | 1/2009 | Patterson et al. | ...... | 707/999.202 |
| 7,774,391 B1 * | 8/2010 | Le et al. | ......................... | 707/822 |
| 8,280,908 B2 * | 10/2012 | Khalidi et al. | ................ | 707/791 |
| 8,332,441 B2 * | 12/2012 | Aurora | ......................... | 707/821 |
| 8,433,864 B1 * | 4/2013 | Narayanan | .................... | 711/162 |
| 2003/0182326 A1 * | 9/2003 | Patterson | ...................... | 707/204 |
| 2008/0005133 A1 * | 1/2008 | Khalidi et al. | ................ | 707/100 |
| 2008/0109394 A1 * | 5/2008 | Havens et al. | ......... | 707/E17.01 |
| 2009/0077141 A1 * | 3/2009 | Hady et al. | ..................... | 707/204 |
| 2009/0319534 A1 * | 12/2009 | Gokhale | ........................ | 707/10 |
| 2010/0070474 A1 * | 3/2010 | Lad | ............... | 707/624 |
| 2010/0262638 A1 * | 10/2010 | Fitzgerald | .................... | 707/822 |
| 2011/0113013 A1 * | 5/2011 | Reddy et al. | .................. | 707/646 |
| 2011/0161299 A1 * | 6/2011 | Prahlad et al. | ................ | 707/649 |
| 2011/0173404 A1 * | 7/2011 | Eastman et al. | .............. | 711/162 |
| 2011/0231370 A1 * | 9/2011 | Aurora | ......................... | 707/667 |
| 2012/0016839 A1 * | 1/2012 | Yueh | ............................ | 707/624 |
| 2013/0132346 A1 * | 5/2013 | Varadarajan | .................. | 707/639 |

* cited by examiner

*Primary Examiner* — Jean B Fleurantin
*Assistant Examiner* — Evan Aspinwall
(74) *Attorney, Agent, or Firm* — Wilmer Cutler Pickering Hale and Dorr LLP

(57) ABSTRACT

A method and system for merging files of multiple volumes in a data store to a single merged volume. The method includes creating one or more snapshots of one or more volumes of a data store of a first system. Files in the one or more snapshots are merged into a merged volume. The merged volume is mounted and stored in a second system.

20 Claims, 8 Drawing Sheets

VOLUME AND PARTIAL VOLUME MERGE TO SYNCHRONIZE TO NON-HOMOGENEOUS DRIVE LAYOUTS

BACKGROUND

Migration of data files on enterprise and personal computers is important for multiple reasons, to include providing backup capabilities for disaster recovery and work transfer. The typical scenario assumes that the data will be migrated back to the same personal computer or a computer with a similar drive layout structure. That is, for each volume, its corresponding backup is an exact replica of the original volume. For instance, a user may have an original system with three volumes: C: (SYSTEM), D: (DATA), and E: (DATA). The user may choose to migrate one or more of the volumes as a copy to a backup system, wherein each volume as a whole is migrated to a computer with a similar drive layout structure. The user may also choose to migrate part of a volume, wherein selected files of the volume are migrated as a copy to the backup system.

On the other hand, migration of volumes to a computer system with a non-homogenous drive layout structure is not currently accomplished. This is a common user experience. For instance, a user may have an office desktop with three volumes or drives and would like to migrate files in those volumes to an office laptop that has only two partitions. This is not possible without reconfiguration of the drive layouts in one or both of the original and backup systems.

To help illustrate the problem of migration between systems with non-homogenous drive layout structures, a user may have an original system with three volumes: C: (SYSTEM), D: (DATA), and E: (DATA). The user wishes to migrate one or more volumes to a system with a non-homogeneous drive layout structure, such as, a laptop that only has two volumes: C: (SYSTEM) and D: (DATA). For instance, the user may wish to migrate volumes in the original system containing data (D: and E:) to the laptop that only has one volume available for data: D: (DATA). That is, the user wishes to but is prevented from migrating two volumes D: (DATA), and E: (DATA) to one volume D: (DATA) in a way that files of both data volumes in the original system are preserved.

The same user may be presented with a similar migration problem when initially backing up volumes and then migrating the backed up volumes to a system with a non-homogenous drive layout structure. For instance, given an original system with three volumes: C: (SYSTEM), D: (DATA), and E: (DATA), the user may independently back up volumes D: and E: without further migrating these files to an end system. Later, the user wishes to but is prevented from migrating the two independently backed up volume images D: and E: to a single drive D: in the above described laptop.

However, in the above examples, migration to a system with a non-homogeneous drive layout structure is not possible using conventional techniques. This is unsatisfactory in many situations where users utilizing multiple computing systems with disparate drive layout structures wish to migrate volumes of data between the two systems.

SUMMARY

Systems and methods of merging files between systems with non-homogenous drive layouts. In one embodiment, a computer implemented method for storing files is disclosed in which files of multiple volumes of a data store are merged into a merged volume. The method includes creating one or more snapshots of one or more volumes of a data store of a first system. Files in the one or more snapshots are included in a merged volume. The merged volume is stored in a second system.

In one implementation, files are merged at the time of migration to another system. That is, fully functional copies or snapshots of volumes of the first system are stored in a temporary data store, such as, a backup system. When prompted for merging and migration, files in the snapshots of volumes are then stored in a merged volume created in a second system at the time of migration. In a second implementation, files are merged and stored in a backup system before migration to another system. That is, the merged volume is created and stored in the backup or second system in preparation of migrating the merged volume to another system. In particular, snapshots of volumes of the first system are created. Files in the snapshots are then stored in a merged volume created in the second system, or backup system. The merged volume is ready for migration to another system.

In some embodiments, a system includes a tangible, non-transitory computer-readable storage medium having stored thereon, computer-executable instructions that, when executed causes the computer system to perform a method for storing files, in which files of multiple volumes of a data store are included in a merged volume. The method includes creating one or more snapshots of one or more volumes of a data store of a first system. Files in the one or more snapshots are merged and included in a merged volume. The merged volume is stored in a second system. In one implementation, files are merged and stored in a backup system before migration to another system. In a second implementation, files are merged at the time of migration. More particularly, the merging operation resolves clashes between files of different volumes. For instance, a clash is determined between files of the first system, such as, a first file in a first volume and a second file in a second volume. During the merging operations, any unwanted files are not merged into the merged volume, and wanted files are merged into the merged volume. In addition, files that do not have any clashes with any other files are also merged into the merged volume.

In one embodiment, a computer system comprises a processor coupled to memory having stored therein instructions that, if executed by the computer system, cause the computer to execute a method for storing files in which files of multiple volumes of a data store are merged into a merged volume. The method includes creating one or more snapshots of one or more volumes of a data store of a first system. Files in the one or more snapshots are included in a merged volume. The merged volume is stored in a second system. In one implementation, files are merged during migration to another system. For instance, the one or more volumes are stored as one or more backup volumes or snapshot volumes in a backup system. A merged volume created from files in the snapshots is then mounted in the second system in accordance with a selected file format. Files from the snapshots are then copied to the merged volume stored in the second system. In a second implementation, files are merged and stored before migration to a target system. As such, the merged volume in the second system comprises a backup volume to the first system. At the time of migration, a second volume is mounted according to a selected file format in a third system. Files in the merged volume are then copied to the second volume that is mounted in a third system, which is the end or target system.

Thus, according to embodiments of the present disclosure, migration of volumes is possible between systems with non-homogenous drive layout structures. As such, methods and systems for performing synchronization between non-homogeneous drive layout structures to include volume and partial volume merge are disclosed.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Figure 1:
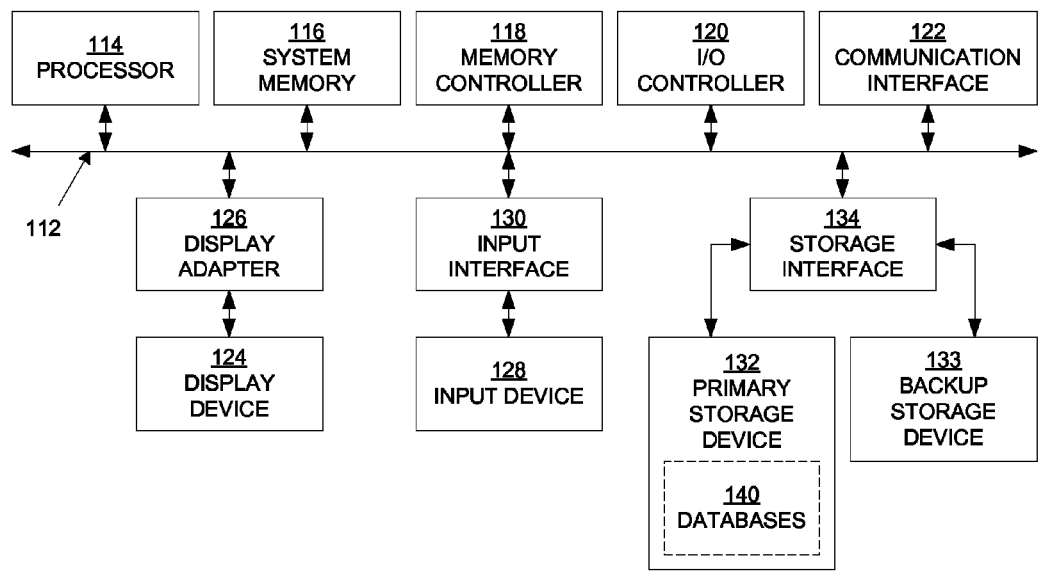
FIG. 1 depicts a block diagram of an exemplary computer system suitable for implementing the present methods in accordance with one embodiment of the present disclosure.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "creating," "generating," "merging," "storing," "copying," "mounting," or the like, refer to actions and processes (e.g., flowchart 3 of FIG. 3, flowchart 7 of FIG. 7, and flowchart 8 of FIG. 8) of a computer system or similar electronic computing device or processor (e.g., system 110 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

FIG. 1 is a block diagram of an example of a computing system 110 capable of implementing embodiments of the present disclosure. Computing system 110 broadly represents any single or multi-processor computing device or system capable of executing computer-readable instructions. Examples of computing system 110 include, without limitation, workstations, laptops, client-side terminals, servers, distributed computing systems, handheld devices, or any other computing system or device. In its most basic configuration, computing system 110 may include at least one processor 114 and a system memory 116.

Processor 114 generally represents any type or form of processing unit capable of processing data or interpreting and executing instructions. In certain embodiments, processor 114 may receive instructions from a software application or module. These instructions may cause processor 114 to perform the functions of one or more of the example embodiments described and/or illustrated herein. For example, processor 114 may perform and/or be a means for performing, either alone or in combination with other elements, one or more of the identifying, determining, using, implementing, translating, tracking, receiving, moving, and providing described herein. Processor 114 may also perform and/or be a means for performing any other steps, methods, or processes described and/or illustrated herein.

System memory 116 generally represents any type or form of volatile or non-volatile storage device or medium capable of storing data and/or other computer-readable instructions. Examples of system memory 116 include, without limitation, RAM, ROM, flash memory, or any other suitable memory device. Although not required, in certain embodiments computing system 110 may include both a volatile memory unit (such as, for example, system memory 116) and a non-volatile storage device (such as, for example, primary storage device 132).

Computing system 110 may also include one or more components or elements in addition to processor 114 and system memory 116. For example, in the embodiment of FIG. 1, computing system 110 includes a memory controller 118, an input/output (I/O) controller 120, and a communication interface 122, each of which may be interconnected via a communication infrastructure 112. Communication infrastructure 112 generally represents any type or form of infrastructure capable of facilitating communication between one or more components of a computing device. Examples of communication infrastructure 112 include, without limitation, a communication bus (such as an Industry Standard Architecture (ISA), Peripheral Component Interconnect (PCI), PCI Express (PCIe), or similar bus) and a network.

Memory controller 118 generally represents any type or form of device capable of handling memory or data or controlling communication between one or more components of computing system 110. For example, memory controller 118 may control communication between processor 114, system memory 116, and I/O controller 120 via communication infrastructure 112. Memory controller may perform and/or be a means for performing, either alone or in combination with other elements, one or more of the operations or features described herein.

I/O controller 120 generally represents any type or form of module capable of coordinating and/or controlling the input and output functions of a computing device. For example, I/O controller 120 may control or facilitate transfer of data between one or more elements of computing system 110, such as processor 114, system memory 116, communication interface 122, display adapter 126, input interface 130, and storage interface 134. I/O controller 120 may be used, for example, to perform and/or be a means for performing, either alone or in combination with other elements, one or more of the operations described herein. I/O controller 120 may also be used to perform and/or be a means for performing other operations and features set forth in the instant disclosure.

Communication interface 122 broadly represents any type or form of communication device or adapter capable of facilitating communication between example computing system 110 and one or more additional devices. For example, communication interface 122 may facilitate communication between computing system 110 and a private or public network including additional computing systems. Examples of communication interface 122 include, without limitation, a wired network interface (such as a network interface card), a wireless network interface (such as a wireless network interface card), a modem, and any other suitable interface. In one embodiment, communication interface 122 provides a direct connection to a remote server via a direct link to a network, such as the Internet. Communication interface 122 may also indirectly provide such a connection through, for example, a local area network (such as an Ethernet network), a personal area network, a telephone or cable network, a cellular telephone connection, a satellite data connection, or any other suitable connection.

Communication interface 122 may also represent a host adapter configured to facilitate communication between computing system 110 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 122 may also allow computing system 110 to engage in distributed or remote computing. For example, communication interface 122 may receive instructions from a remote device or send instructions to a remote device for execution. Communication interface 122 may perform and/or be a means for performing, either alone or in combination with other elements, one or more of the operations disclosed herein. Communication interface 122 may also be used to perform and/or be a means for performing other operations and features set forth in the instant disclosure.

As illustrated in FIG. 1, computing system 110 may also include at least one display device 124 coupled to communication infrastructure 112 via a display adapter 126. Display device 124 generally represents any type or form of device capable of visually displaying information forwarded by display adapter 126. Similarly, display adapter 126 generally represents any type or form of device configured to forward graphics, text, and other data from communication infrastructure 112 (or from a frame buffer, as known in the art) for display on display device 124.

As illustrated in FIG. 1, computing system 110 may also include at least one input device 128 coupled to communication infrastructure 112 via an input interface 130. Input device 128 generally represents any type or form of input device capable of providing input, either computer- or human-generated, to computing system 110. Examples of input device 128 include, without limitation, a keyboard, a pointing device, a speech recognition device, or any other input device. In one embodiment, input device 128 may perform and/or be a means for performing, either alone or in combination with other elements, one or more of the operations disclosed herein. Input device 128 may also be used to perform and/or be a means for performing other operations and features set forth in the instant disclosure.

As illustrated in FIG. 1, computing system 110 may also include a primary storage device 132 and a backup storage device 133 coupled to communication infrastructure 112 via a storage interface 134. Storage devices 132 and 133 generally represent any type or form of storage device or medium capable of storing data and/or other computer-readable instructions. For example, storage devices 132 and 133 may be a magnetic disk drive (e.g., a so-called hard drive), a floppy disk drive, a magnetic tape drive, an optical disk drive, a flash drive, or the like. Storage interface 134 generally represents any type or form of interface or device for transferring data between storage devices 132 and 133 and other components of computing system 110.

In one example, databases 140 may be stored in primary storage device 132. Databases 140 may represent portions of a single database or computing device or a plurality of databases or computing devices. For example, databases 140 may represent (be stored on) a portion of computing system 110 and/or portions of example network architecture 200 in FIG. 2 (below). Alternatively, databases 140 may represent (be stored on) one or more physically separate devices capable of being accessed by a computing device, such as computing system 110 and/or portions of network architecture 200.

Continuing with reference to FIG. 1, storage devices 132 and 133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 132 and 133 may also include other similar structures or devices for allowing computer software, data, or other computer-readable instructions to be loaded into computing system 110. For example, storage devices 132 and 133 may be configured to read and write software, data, or other computer-readable information. Storage devices 132 and 133 may also be a part of computing system 110 or may be separate devices accessed through other interface systems.

Storage devices 132 and 133 may be used to perform, and/or be a means for performing, either alone or in combination with other elements, one or more of the operations disclosed herein. Storage devices 132 and 133 may also be used to perform, and/or be a means for performing, other operations and features set forth in the instant disclosure.

Many other devices or subsystems may be connected to computing system 110. Conversely, all of the components and devices illustrated in FIG. 1 need not be present to practice the embodiments described herein. The devices and subsystems referenced above may also be interconnected in different ways from that shown in FIG. 1. Computing system 110 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 110. All or a portion of the computer program stored on the computer-readable medium may then be stored in system memory 116 and/or various portions of storage devices 132 and 133. When executed by processor 114, a computer program loaded into computing system 110 may cause processor 114 to perform and/or be a means for performing the functions of the example embodiments described and/or illustrated herein. Additionally or alternatively, the example embodiments described and/or illustrated herein may be implemented in firmware and/or hardware. For example, computing system 110 may be configured as an application specific integrated circuit (ASIC) adapted to implement one or more of the embodiments disclosed herein.

Figure 2:
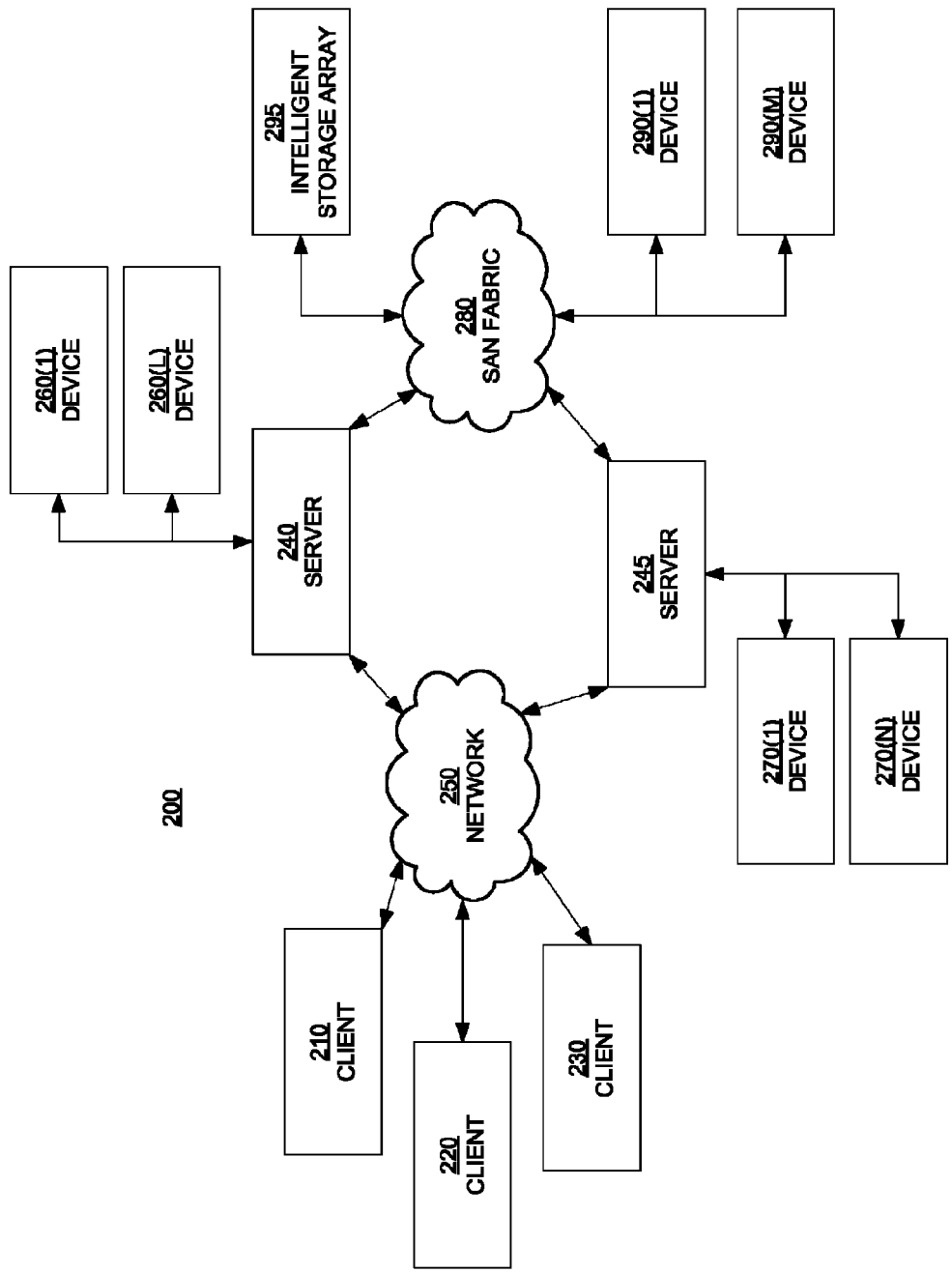
FIG. 2 is a block diagram depicting a network architecture in accordance with one embodiment of the present disclosure.

FIG. 2 is a block diagram of an example of a network architecture 200 in which client systems 210, 220, and 230 and servers 240 and 245 may be coupled to a network 250. Client systems 210, 220, and 230 generally represent any type or form of computing device or system, such as computing system 110 of FIG. 1.

Similarly, servers 240 and 245 generally represent computing devices or systems, such as application servers or database servers, configured to provide various database services and/or run certain software applications. Network 250 generally represents any telecommunication or computer network including, for example, an intranet, a wide area network (WAN), a local area network (LAN), a personal area network (PAN), or the Internet.

As illustrated in FIG. 2, one or more storage devices 260(1)-(L) may be directly attached to server 240. Similarly, one or more storage devices 270(1)-(N) may be directly attached to server 245. Storage devices 260(1)-(L) and storage devices 270(1)-(N) generally represent any type or form of storage device or medium capable of storing data and/or other computer-readable instructions. Storage devices 260(1)-(L) and storage devices 270(1)-(N) may represent network-attached storage (NAS) devices configured to communicate with servers 240 and 245 using various protocols, such as Network File System (NFS), Server Message Block (SMB), or Common Internet File System (CIFS).

Servers 240 and 245 may also be connected to a storage area network (SAN) fabric 280. SAN fabric 280 generally represents any type or form of computer network or architecture capable of facilitating communication between storage devices. SAN fabric 280 may facilitate communication between servers 240 and 245 and storage devices 290(1)-(M) and/or an intelligent storage array 295. SAN fabric 280 may also facilitate, via network 250 and servers 240 and 245, communication between client systems 210, 220, and 230 and storage devices 290(1)-(M) and/or intelligent storage array 295 in such a manner that devices 290(1)-(M) and array 295 appear as locally attached devices to client systems 210, 220, and 230. As with storage devices 260(1)-(L) and storage devices 270(1)-(N), storage devices 290(1)-(M) and intelligent storage array 295 generally represent any type or form of storage device or medium capable of storing data and/or other computer-readable instructions.

With reference to computing system 110 of FIG. 1, a communication interface, such as communication interface 122, may be used to provide connectivity between each client system 210, 220, and 230 and network 250. Client systems 210, 220, and 230 may be able to access information on server 240 or 245 using, for example, a Web browser or other client software. Such software may allow client systems 210, 220, and 230 to access data hosted by server 240, server 245, storage devices 260(1)-(L), storage devices 270(1)-(N), storage devices 290(1)-(M), or intelligent storage array 295. Although FIG. 2 depicts the use of a network (such as the Internet) for exchanging data, the embodiments described herein are not limited to the Internet or any particular network-based environment.

Returning to FIG. 2, in one embodiment, all or a portion of one or more of the example embodiments disclosed herein are encoded as a computer program and loaded onto and executed by server 240, server 245, storage devices 260(1)-(L), storage devices 270(1)-(N), storage devices 290(1)-(M), intelligent storage array 295, or any combination thereof. All or a portion of one or more of the example embodiments disclosed herein may also be encoded as a computer program, stored in server 240, run by server 245, and distributed to client systems 210, 220, and 230 over network 250. Accordingly, network architecture 200 may perform and/or be a means for performing, either alone or in combination with other elements, one or more of the operations disclosed herein. Network architecture 200 may also be used to perform and/or be a means for performing other operations and features set forth in the instant disclosure.

Accordingly, embodiments of the present disclosure illustrate the implementation of a migration solution between computing systems having disparate drive layout structures. In still other embodiments, volume synchronization is enabled between computing system having disparate drive layout structures. In still other embodiments, data storage synchronization is possible with portable devices such that multiple storage volumes are merged into a single volume stored on the portable device, wherein files in the merged volume are synchronized with the original files stored in the multiple volumes.

Embodiments of the present disclosure are described within the context of a data or file storage system. As previously described, the storage system provides for storing and organizing computer information, files and their data, for example within the storage devices of FIG. 2. At a high level, the storage system organizes files into a database for storage, organization, manipulation and retrieval by one or more requesting computing systems. In some embodiments, the file storage system supports a single user associated with a single computing system. In other embodiments, the file storage system supports a large enterprise including individuals (e.g., company, corporation, etc.).

Embodiments of the present disclosure are described within the context of the organization structure of a computing system. In particular, the merging and synchronization of files between multiple computing systems occurs at a specific level. For instance, in one embodiment, the merging and synchronization of files occurs at a volume level within a single file system, wherein the term "volume" defines a logical area within the physical space of a data storage system. Put another way, a "volume" may define the logical interface of an operating system to access data stored in a logical area or instance of a file system. For example, a "volume" may define a logical partitioning of a file system, such as, a logical drive. As an example, a computing system may include three volumes or drives: C: (SYSTEM); D: (DATA); and E: (DATA), wherein the A: and B: drives are reserved for floppy disk drives by convention. As such, embodiments of the present disclosure describe the merging and synchronization of volumes between multiple computing systems.

Figure 3:
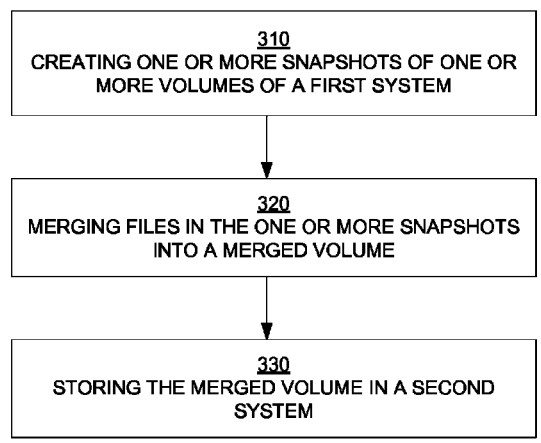
FIG. 3 is a flow diagram depicting a method for storing to include volume and partial volume merging of files to synchronize to systems with non-homogenous drive layouts from the original system, in accordance with one embodiment of the present disclosure.

FIG. 3 is a flow diagram 300 depicting a computer implemented process for storing to include volume and partial volume merging of files in order to synchronize systems with non-homogenous drive layouts, in accordance with one embodiment of the present disclosure. In another embodiment, flow diagram 300 is implemented within a computer system including a processor and memory coupled to the processor and having stored therein instructions that, if executed by the computer system causes the system to execute the method for storing. In still another embodiment, instructions for performing the method are stored on a non-transitory computer-readable storage medium having computer-executable instructions for causing a computer system to perform a method for storing as outlined by flow diagram 300. More particularly, files of a first system are synchronized with files of a second system even though the drive layout structure of the two systems may be non-homogenous.

Consider the case where a computing system has multiple volumes. For instance, a computing system may include three volumes: C: (SYSTEM); D: (DATA); and E: (DATA). Embodiments of the present disclosure are capable of synchronizing and merging files in multiple volumes within a single volume, such that files may be migrated between systems having non-homogenous drive layout structures (e.g., migrating files within a two volume structure to a single volume structure).

At 310, snapshots of one or more volumes of a first system are created. More particularly, a first computing system includes a file system having multiple volumes. All or some of the multiple volumes are selected for migration to another system. Before migration, one or more snapshots of files in those volumes are created. In one implementation, a snapshot of a volume is a time consistent read-only copy of the files within that volume. More particularly, the snapshot provides a state of the system or volume at a particular point in time. In another implementation, the snapshot is directly associated with that volume, such that it is a snapshot of the volume. As such, a snapshot of the volume may be used to provide a backup to the original volume.

In another embodiment, snapshots of partial volumes are created. More particularly, certain files and folders of a volume are backed up in a corresponding snapshot of that volume. For instance, a volume D: (DATA) may include two folders labeled "test" and "photos," but the user selects only the "photos" folder for backing up. In that case, the snapshot created of the volume will include only the folder "photos." Any merging of files from the snapshot of the volume will not include the folder to "test," but will include the folder to "photos."

At 320, files associated with the snapshots are merged into a merged volume. That is, files in the merged volume are synchronized with files in the original, first system, or rather are synchronized with files in the snapshots of the first system. More particularly, files of two different volumes are compared to determine if a clash exists. A clash between files occurs, in part, when the file names are identical. Other criteria are also considered for determining clashing between files in other embodiments. For files that clash, clash resolution is performed to determine which files are wanted, such that wanted files are selected for merging into the merged volume, and unwanted files are not selected.

At 330, the merged volume is stored in a second system. More particularly, the merged volume is mounted and exposed on the second system. For instance, a mount point for the merged volume is determined on the second system, through which storage in the merged volume may be accessed. Once the merged volume is mounted, files in the volume snapshots that are selected for merging are then copied to the merged volume. That is, selected files in the snapshots are copied to the merged volume. In that manner, files in the merged volume are synchronized with files in the snapshots of the original volumes of the first system.

The merging of files can occur while migrating files to a target computing system, or before the actual migration of files to the target computing system. For instance, in one implementation, files are merged during migration to the target computing system. More particularly, a first system includes multiple volumes which are ultimately migrated to a second computing system that is the target computing system. The one or more volumes are stored as one or more backup or snapshot volumes in a temporary, backup system. Clash resolution is performed for files in the snapshots before inclusion in the merged volume. The merged volume is created (e.g., mounted and exposed) in the second computing system, which is the target computing system. Files that are selected for merging are then copied to the merged volume in the second/target system. In a second implementation, files are merged before migration to the target computing system, as it is known that migration is to be performed to a non-homogenous drive layout structure. As such, the merged volume in the second system comprises a backup volume to the first system. That is, the merged file is stored in a backup system. Thereafter, the files in the merged file are migrated to a second volume that is created and mounted in a third system, which is the target computing system. In particular, files in the merged volume are then copied to the second volume that is mounted in the third/target system.

Figure 4:
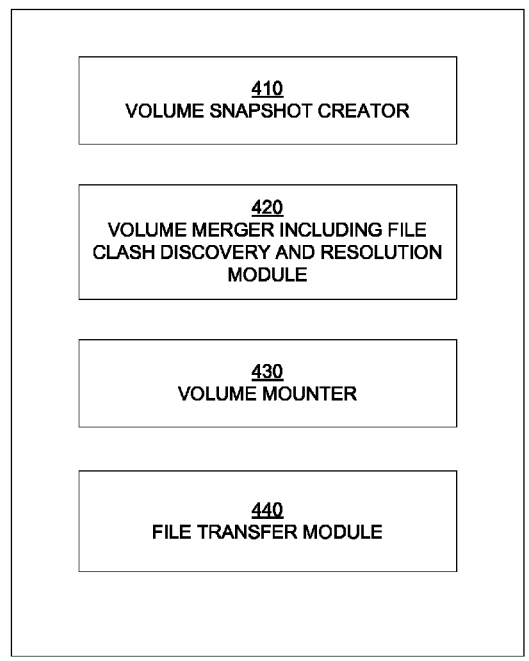
FIG. 4 is a block diagram illustrating a system capable of performing volume and partial volume merging of files to synchronize to systems with non-homogenous drive layouts from the original system, in accordance with one embodiment of the present disclosure.

FIG. 4 is a block diagram illustrating a system 400 capable of performing volume and partial volume merging of files to synchronize systems with non-homogenous drive layouts, in accordance with one embodiment of the present disclosure. In one embodiment, system 400 is configured to implement the methods described in flow charts 300, 600, 700 and 800 of FIGS. 3, 6, 7, and 8, respectively.

In particular, system 400 includes a volume snapshot creator 410 that creates one or more snapshots of volumes to be migrated from a first system. For instance, volume snapshot creator 410 is configured to implement the operation 310 of FIG. 300, in one embodiment. As previously described, in one implementation, the snapshot comprises a read-only copy of files contained within a volume. As such, the snapshot of the volume comprises a backup to that volume at a particular moment in time.

Additionally, system 400 includes a volume merger 420, which is configured to merge files from multiple volumes and/or partial volumes into a single file. In that manner, files included within multiple volumes of a first system are migrated to a second system through a merging process. More particularly, files associated with the snapshots are merged into a merged volume. For instance, volume merger 420 is configured to implement the operation 320 of FIG. 300, in one embodiment. In another embodiment, the merging process occurs during migration to the second or target system. In another embodiment, the merging process occurs before final migration to the target system, and as such, the merged volume is stored as a backup file in the second system, before migration to the target system. During the merging process, the volume merger 420 performs clash discovery and resolution. That is, the volume merger 420 is able to determine if a file in a first volume clashes with a file in a second volume, wherein the first and second volumes are included in a first system. In part, a clash is discovered when two files have the same identifier, such as the same file name. When a clash is discovered, volume merger is capable of resolving the clash by determining which file or files are wanted. More particularly, unwanted files are not merged and wanted files are selected for merging after the clash is resolved, such as, through a renaming process.

A clash is resolved in such a manner to preserve files from both volumes. As an illustration, it is possible that two different volumes D: (DATA) and E: (DATA) independently have the same file and folder (e.g., D:\Photos\phot1.jpg and E:\Photos\phot1.jpg). Clash resolution would preserve only one file if the contents of the two photo files are identical. On the other hand, if the file contents were not identical, then the user is prompted to select a file for merging. If both files are selected for migration, then the files are renamed accordingly before merging.

System 400 also includes a volume mounter 430. During the merging process, files are stored in a merged volume of a second system. In one implementation, the merged volume is created in a target system, such that files are migrated from the first system to the target system. In another implementation, the merged volume is created in a backup system, and then migrated to the target system. More particularly, an approximate size of the merged files to be stored in the merged volume is determined. Then a mount point for the merged volume is created on the second system, through which the merged volume may be accessed. As previously described, the second system is the target system in one implementation. In another implementation, the second system is a backup system that temporarily stores the merged volume until migration to the target system.

The file transfer module 440 performs the migration of files to the second system. For instance, file transfer module 440 is configured to implement the operations performed in 330 of flow diagram 300. Specifically, once the merged volume is mounted and exposed in the second system, files in the snapshots of volumes are copied to the merged volume. That is, files in the snapshots selected for merging, and after clashes are resolved, are copied to the merged volume.

Figure 5:
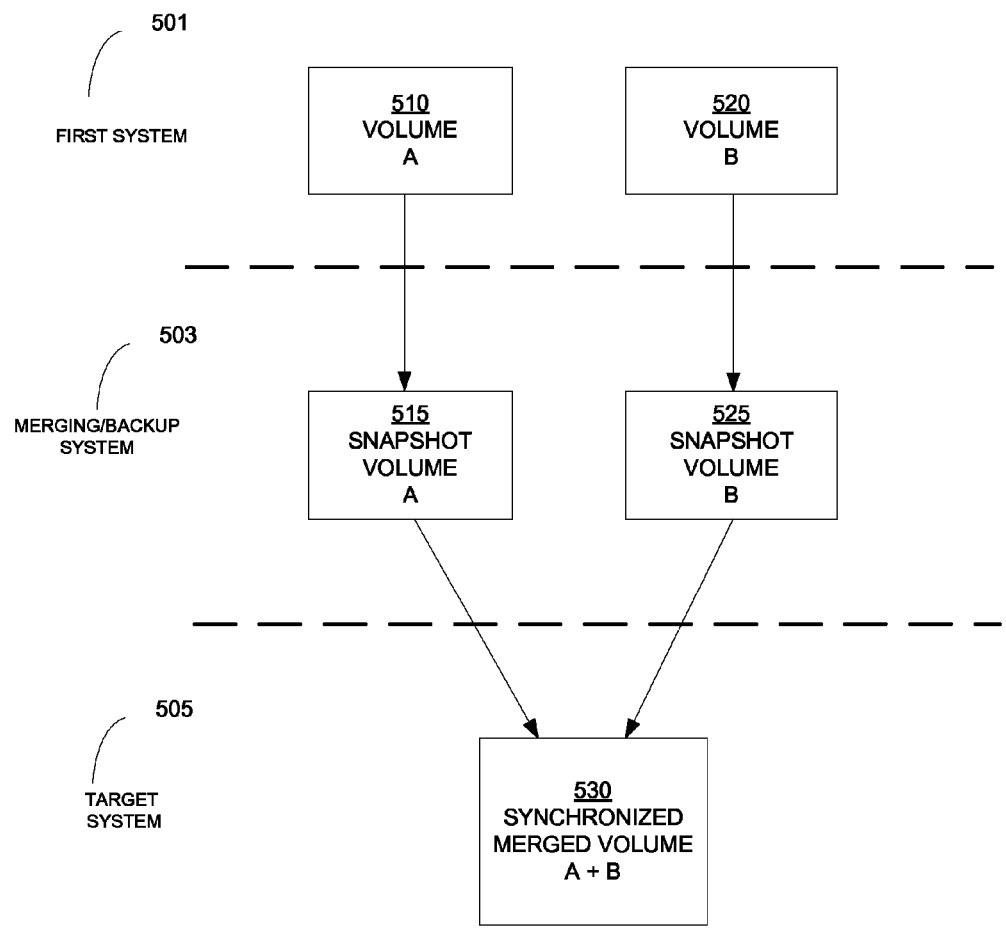
FIG. 5 is a data flow diagram depicting the merging of files when migrating files from a first system to a second system having a non-homogeneous drive layout, in accordance with one embodiment of the present disclosure.

FIG. 5 is a data flow diagram 500 depicting the merging of files when migrating files from a first system to a target system having a non-homogeneous drive layout, in accordance with one embodiment of the present disclosure. The merging of files performed in data flow diagram is performed during the migration of files to the target system 505. The operations performed by flow diagram 500 are implemented by system 400 in order to migrate files between systems having non-homogenous drive layouts, in one embodiment.

Flow diagram 500 is implemented to migrate files between systems with non-homogenous drive layout structures. For illustration purposes only, migration of files may occur between a first system that includes three volumes: C: (SYSTEM); D: (DATA); and E: (DATA), to a second system that includes a different number of volumes, such as, a lesser number of volumes: C: (SYSTEM) and D: (DATA). Diagram 500 illustrates the flow of data when migrating files from the first system 501 to the target system 505 in a non-destructive fashion, such that files are preserved and synchronized between the two systems. Under one scenario, the target system 505 is not known, and as such, it is unknown whether the file system of the target system 505 has a homogenous or non-homogenous drive layout structure when compared to the first system 501.

As shown, a first system 501 includes multiple volumes. For illustration, first system includes volume A 510 and volume B 520. In one implementation, these volumes 510 and 520 are fully operational in that one or more users may access files in both of these volumes to perform, in part, read and write operations. In this case, these volumes 510 and 520 may be included in an original system.

A merging and/or backup system 503 creates one or more backup files of the multiple volumes included in the original system 501. In one embodiment, the backup files are snapshots of the volumes or partial volumes. In particular, for each volume, the backup system creates a snapshot volume that is a copy of the files in the original volume at a particular point in time. In that manner, should a volume in the first system 501 fail, that volume may be restored through the corresponding backup files. As shown in FIG. 5, merging system 503 includes snapshot 515 of volume A. That is, snapshot 515 is a copy of volume A 510 in the first system 501 at a particular moment in time. In addition, merging system 503 includes snapshot 525 of volume B. That is, snapshot 525 is a copy of volume B 520 in the merging system 501 at a particular moment in time. From these snapshot volumes, merging and migration of files is performed.

More particularly, merging of files occurs during migration to the target system 505. That is, a merged volume 530 is created in the target system 505. For instance, merged volume 530 is mounted and exposed in the target system 505 in accordance with a selected file format. In one embodiment, the user is prompted to select a particular file format for the merged volume 530, especially when the snapshot volumes 515 and 525, corresponding to original volumes 510 and 520, are of different formats. For instance, when snapshot volume A 515 is configured using a file allocation table (FAT) format and snapshot volume B 525 is configured using a new technology file system (NTFS) format, the merged volume 530 is configured using the FAT or NTFS, or a third file format. In one implementation, the format is selected by a user (e.g., user is prompted for the selection). Thereafter, files from the snapshot volumes 515 and 525 are copied to the merged volume 530 that is stored in the target system 505.

The merged volume A+B 530 is synchronized with files originally included in volumes A 510 and B 520 in the first system 501. The synchronization is associated with a state of the first system 501 at a particular moment in time. As such, files in the merged volume 530 may be implemented in a restore operation, in one implementation. In another implementation, the merged volume 530 may be used as a secondary and fully functional copy of the original volumes 510 and 520, such as, when a user migrates files to a laptop from an office desktop for use at a site remote from the office (e.g., home, hotel, off-site location, etc.).

Figure 6:
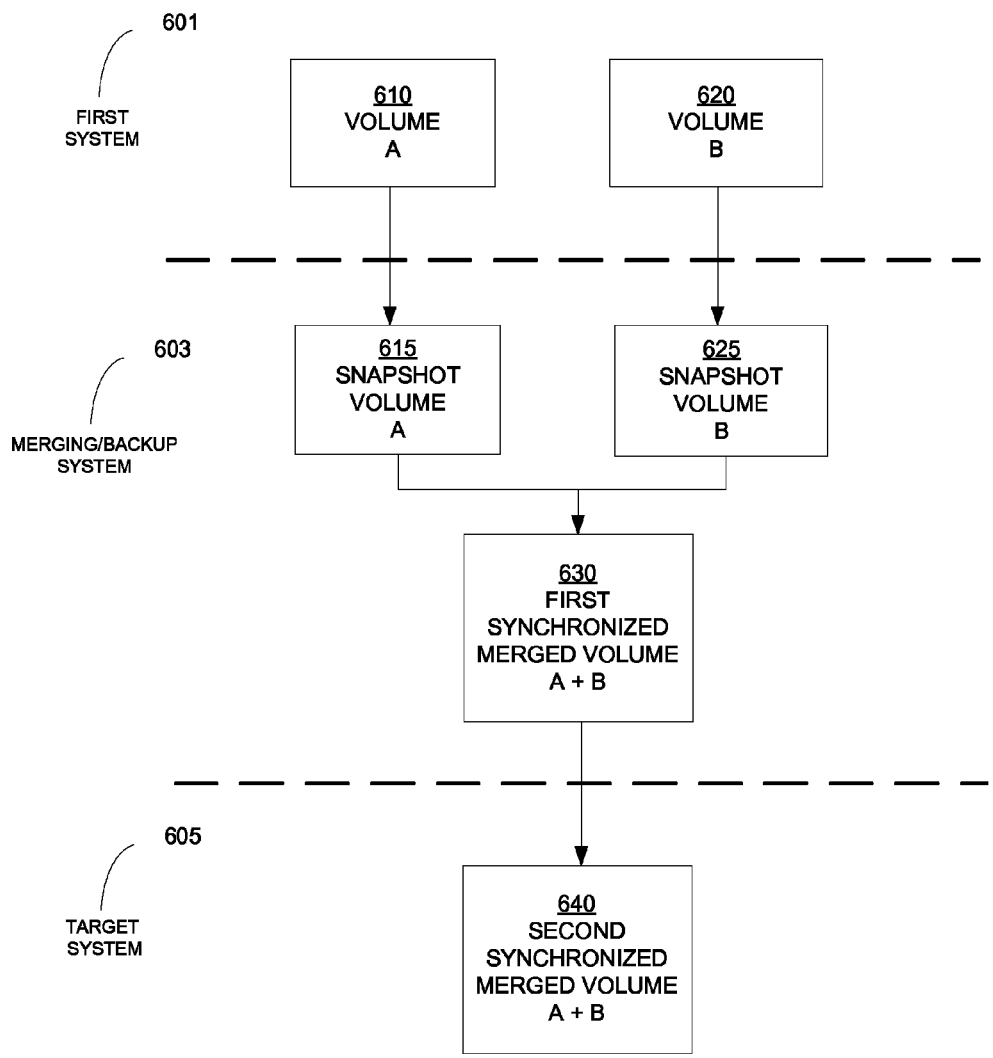
FIG. 6 is a data flow diagram depicting the merging of merging of files in preparation of migrating files from a first system to a second system having a non-homogeneous drive layout, in accordance with one embodiment of the present disclosure.

FIG. 6 is a data flow diagram 600 depicting the merging of merging of files in preparation of migrating files from a first system 601 to a target system 605 having a non-homogeneous drive layout, in accordance with one embodiment of the present disclosure. The merging of files performed in data flow diagram is performed in preparation of the migration of files to the target system 605. The operations performed by flow diagram 600 are implemented by system 400 in order to migrate files between systems having non-homogenous drive layouts, in one embodiment.

For illustration purposes only, migration of files may occur between a first system that includes three volumes: C: (SYSTEM); D: (DATA); and E: (DATA), to a second system that includes a different number of volumes, such as, a lesser number of volumes: C: (SYSTEM) and D: (DATA). As such, both systems include non-homogenous drive layout structures. Diagram 600 illustrates the flow of data when migrating files from the first system 601 to the target system 605 in a non-destructive fashion, such that files are preserved and synchronized between the two systems. Under one scenario, the target system 605 is known, and furthermore is known to have a non-homogenous drive layout structure when compared to the first system 601.

As shown, a first system 601 includes multiple volumes. For illustration, first system includes volume A 610 and volume B 620. In one implementation, volumes 610 and 620 are fully operational in that one or more users may access files in both of these volumes to perform, in part, read and write operations, and may be included in an original system.

A merging and/or backup system 603 creates one or more backup files of the multiple volumes or partial volumes included in the original system 601. For instance, the backup files are snapshots of the volumes 610 and 620, wherein the snapshots are associated with a corresponding point in time. As shown in FIG. 6, merging system 603 includes snapshot volume A 615 of volume A 610. In addition, merging system 603 includes snapshot volume B 625 of volume B 620. As such, snapshots 615 and 625 are copies of volume A 610 and volume B 620. From these snapshot volumes, merging and migration of files is performed.

More particularly, merging of files occurs in preparation of migration to the target system 605. That is, a merged volume 630 is created and stored in the merging system 603. This is accomplished before merging files to the target system 605. For instance, merged volume 630 is mounted and exposed in the merging system 603 in accordance with a selected file format. In one embodiment, the user is prompted to select a particular file format for the merged volume 630, as previously described. This may occur when snapshot volumes 615 and 625 are of different file formats (e.g., FAT, NTFS, etc.). In one implementation, the format is selected by a user. Thereafter, files from the snapshot volumes 615 and 625 are copied to the merged volume 630 that is stored in the merging system 603. A clash discovery and resolution process may also be performed, as will be further described in relation to FIGS. 7 and 8.

The merged volume A+B 630 is synchronized with files originally included in volumes A 610 and B 620 in the first system 601. However, the merged volume 630 is acting in a backup capacity when stored in merging system 603, and is ready for purposes of restoring first system 601 or having a working copy of first system 601. The synchronization is associated with a state of the first system 601 at a particular moment in time.

Because the files in volumes A 610 and 620 have been merged, the merged volume 640 is ready for migration to target system 605. That is, the merging of files has already occurred in preparation of migration to the target system 605. As such, a second merged volume 640 is created and stored in the target system 605. That is, the second merged volume 640 is mounted in the target system 605. The second merged volume 640 is configured in the same file format (e.g., FAT, NTFS, etc.) associated with the first merged volume 630. Thereafter, files from the merged volume 630 are copied to the merged volume 640 that is stored in the target system 605. As such, files in the merged volume 640 may be implemented in a restore operation, in one implementation. In another implementation, the merged volume 640 may be used as a secondary and fully functional copy of the original volumes 610 and 620, such as, when a user migrates files to a laptop from an office desktop for use at a site remote from the office (e.g., home, hotel, off-site location, etc.).

Figure 7:
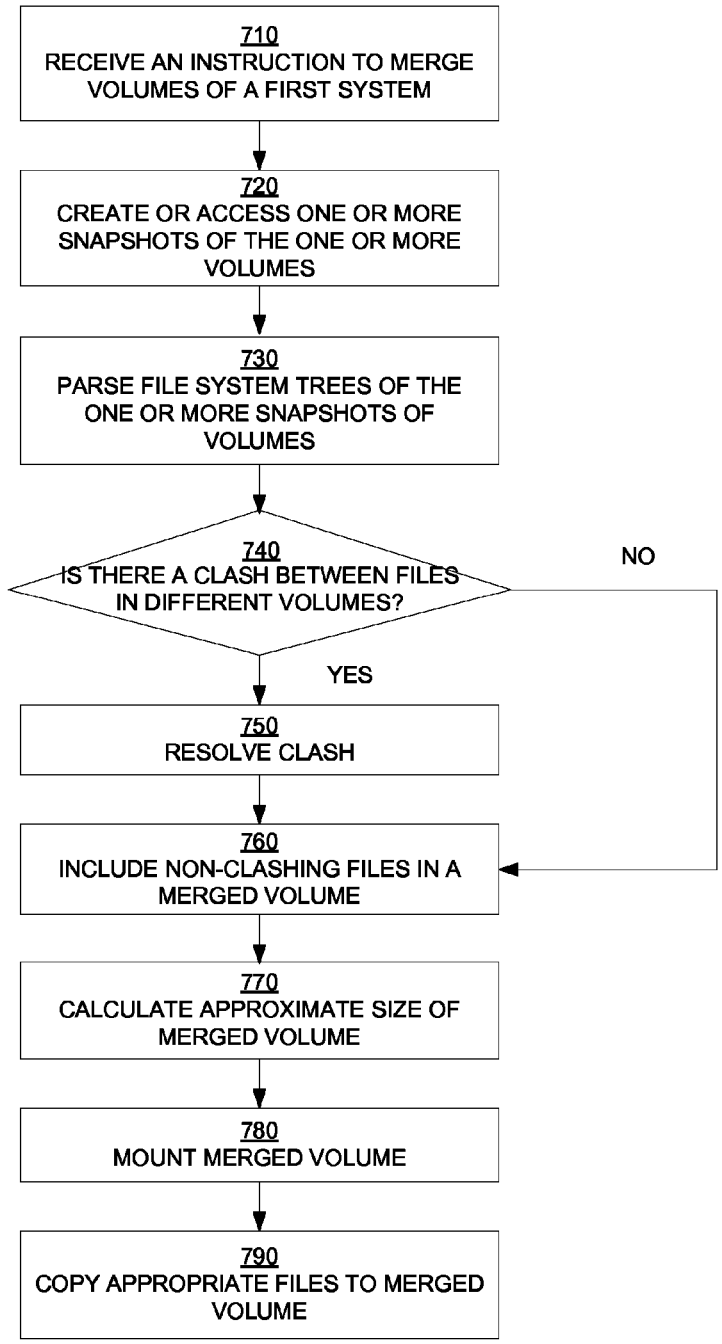
FIG. 7 is a flow diagram depicting a method for volume and partial volume merging of files to synchronize to systems with non-homogenous drive layouts from the original system to include clash resolution between files of two different volumes, in accordance with one embodiment of the present disclosure.

FIG. 7 is a flow diagram 700 depicting a method for volume and partial volume merging of files to synchronize systems with non-homogenous drive layouts to include clash resolution between files of two different volumes, in accordance with one embodiment of the present disclosure. In one embodiment, flow diagram 700 is a computer implemented method. In another embodiment, flow diagram 700 is implemented within a computer system including a processor and memory coupled to the processor and having stored therein instructions that, if executed by the computer system causes the system to execute the method for storing. In still another embodiment, instructions for performing the method are stored on a non-transitory computer-readable storage medium having computer-executable instructions for causing a computer system to perform a method for storing. In still another embodiment, the operations performed in flow diagram 700 are implemented within system 400.

For illustration purposes only, migration of files may occur between a first system that includes three volumes: C: (SYSTEM); D: (DATA); and E: (DATA), to a second system that includes a different number of volumes, such as, a lesser number of volumes: C: (SYSTEM) and D: (DATA). As such, both systems include non-homogenous drive layout structures, wherein the first system has three drives/volumes and the second system has two drives/volumes. The operations outlined in flow diagram 700 are performed to migrate files between the two systems with non-homogenous drive layout structures. In addition, the operations in flow diagram 700 are performed to provide system synchronization. That is, files in a first system may be synchronized with files in a second system having a non-homogeneous drive layout structure, by migrating files between the two systems using embodiments of the present disclosure.

At 710, an instruction is received to merge volumes of a first system. The first system may include multiple volumes, as illustrated in the above example. The first system may provide full access to the files within the volumes to perform various operations, such as, read and write operations, among others. At 720, one or more snapshots are created of the one or more volumes included in the original, first system. In particular, a corresponding snapshot volume is created for each volume in the first system. In that manner, states of the volumes are frozen in time for purposes of migrating files in those volumes.

At 730, a merging of files in the multiple volumes is performed. Specifically, each volume is associated with a file system tree, or some other characterization of files, that is used to identify and provide access to files contained within the volume. The file system trees are parsed to verify and discover clashes between files in different volumes contained within the snapshot volumes, and correspondingly within the original volumes of the first system.

In particular, at 740 it is determined whether a clash exists between two files located in different volumes. For instance, file A in volume A and file B in volume B are compared to determined whether there is a clash. A clash exists when file A and file B have identical identifiers (e.g., file names), in one embodiment. If there is no clash between the two files, then the process proceeds to operation 760 where non-clashing files are included in a merged volume. That is, the non-clashing files are identified for migration into the merged volume. On the other hand, if there is a clash between the two files, then the process proceeds to operation 750, wherein the clash is resolved. A further discussion of discovering and resolving clashes is provided in FIG. 8 below. After the clash is resolved, non-clashing files are included in a merged volume in operation 760.

At 770, the approximate size of the merged volume is calculated. This calculation takes into consideration any clashing between files. As such, the size of the merged volume is used for purposes of determining storing and mounting the merged volume in a backup system or the target system. Thereafter, at 780 the merged volume is mounted and exposed. In one implementation, the merged volume is mounted and exposed in the target system. In addition, the mounted, merged volume is assigned a drive letter. In another implementation, the merged volume is mounted and exposed in a backup system in preparation of migrating files to the target system. The mounted, merged volume is assigned a drive letter. As such, at 790, appropriate files selected for merging are copied to the merged volume.

Figure 8:
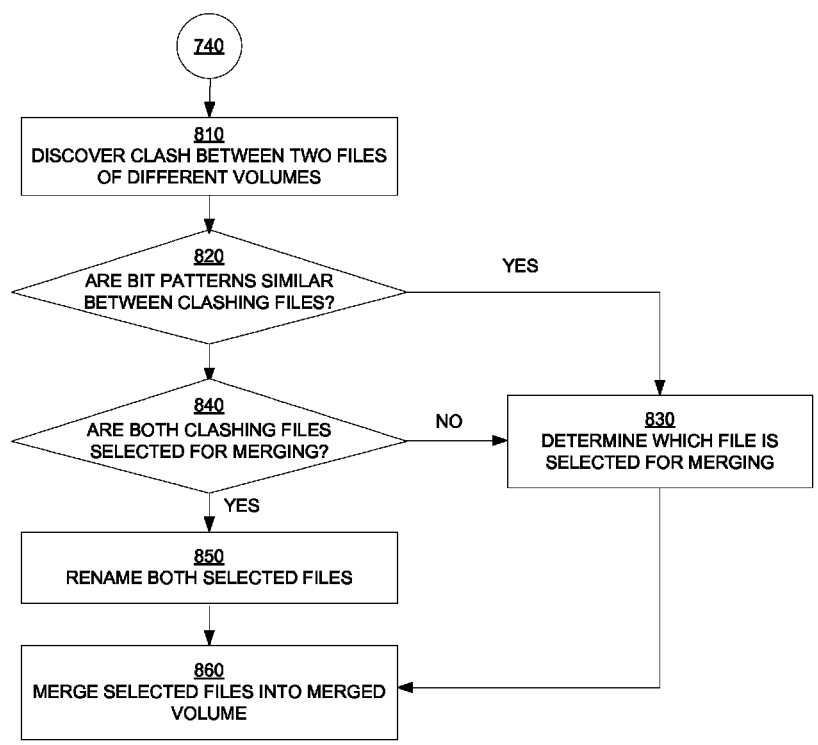
FIG. 8 is a flow diagram depicting method for performing clash resolution when merging files between systems with non-homogenous drive layouts, in accordance with one embodiment of the present disclosure.

FIG. 8 is a flow diagram 800 depicting a method for performing clash resolution when merging files between systems with non-homogenous drive layouts, in accordance with one embodiment of the present disclosure. More particularly, the operations performed in flow diagram 800 provide further illustration to the operations performed in relation to 740 and 750 of flow diagram 700.

In particular, at 810, a clash is discovered between two files of different volumes of a first system. For instance, a clash exists between a first file in a first volume and a second file in a second volume. These volumes have been previously designated for migration to a target system, or a back-up system in preparation of migration to the target system. For instance, if a first file in volume A has the same identifier as a second file in volume B, additional operations are performed to determine whether each file is unwanted or wanted for merging. Specifically, a clash is discovered when identifiers for the two files are identical, such as, having the same file name. Additional operations are performed to determine the extent of the clashing and to determine what is needed to resolve the clashing.

At 820, bit patterns are analyzed and compared between the two clashing files. Bit patterns for the entire files or portions of the files are analyzed. This is performed to determine if the information contained within the two files are substantially identical, which indicates that one file is a copy of the other file. If the bit patterns are substantially similar, then at 830 it is determined which file is selected for synching and merging. For instance, a bit bittern for the first file substantially matches the corresponding bit pattern for the second file. That is, if both contain the same information, only one file is needed for merging. In one embodiment, the selected file is determined by the user. In the rare case that both files are wanted by the user, then the operation at 850 is performed. After a file is selected, the process continues to operation 860, where selected files are identified for merging into the merged volume.

On the other hand, if the bit patterns are not substantially similar, then at 840 it is determined which of the files are selected for synchronizing and merging. For instance, a bit bittern for the first file does not substantially match the corresponding bit pattern for the second file. That is, both files contain different information. The information contained in one file may be completely independent of the information contained in the second file. However, the information contained in one file may be closely related to the information contained in the second file. For instance, the second file may be an updated version of the first file. As such, the user is prompted to resolve the clash, and in one implementation, the user is prompted to determine which file is selected for merging and synchronizing.

If both files are not selected, then the wanted file is identified in 830, in which the selected file is determined for merging. The file identifier or name need not be changed in this case, since only one file is to be merged. On the other hand, if both files are selected for merging, then both files are renamed at 850. In one implementation, the files are automatically renamed. For instance, when both have a file name "filename," the first file may be renamed to "filename1" and the second file may be renamed to "filename2." Thereafter, from 830 and 860, at 860 selected files that have gone through clash resolution are merged into the merged volume.

Thus, according to embodiments of the present disclosure, systems and methods are described in which files in multiple volumes are migrated between systems with non-homogenous drive layout structures, such that files in one more volumes of a first system are migrated and merged to a merged volume of a second system.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

The invention claimed is:

1. A computer implemented method for storing comprising:
   creating one or more snapshots of one or more volumes of a first system;
   determining if a clash exists between a first file in a first volume and a second file in a second volume, wherein said determining comprises determining if a first identifier for said first file matches a second identifier for said second file, wherein said determining further comprises determining if a bit pattern for said first file matches a corresponding bit pattern for said second file;
   merging files in said one or more snapshots into a merged volume, wherein said merging comprises determining which of said first file and said second file are wanted, wherein said merging further comprises merging only wanted files in said merged volume;
   calculating a size of said merged volume based at least in part on clashing between said files; and
   storing said merged volume in a second system based upon the size of said merged volume;
   wherein a first file format of said first system is different from a second file format of said second system, and wherein files of the first system are synchronized with files of the second system.

2. The computer implemented method of claim 1, further comprising:
   storing said one or more snapshots in a backup system;
   said storing said merged volume further comprising mounting said merged volume in accordance with a selected file format in said second system; and
   said storing said merged volume further comprising copying merged files from said one or more snapshots to said mounted, merged volume.

3. The computer implemented method of claim 1, wherein said merged volume comprises a backup volume to said first system, and said method further comprising:
   mounting a second merged volume according to a selected file format in a third system; and
   copying files from said merged volume to said second merged volume.

4. The computer implemented method of claim 1, wherein said merging further comprises:
   determining a clash exists between said first file in said first volume and said second file in said second volume;
   determining said first file is unwanted such that said first file is not merged into said merged volume; and
   merging said second file in said merged volume.

5. The computer implemented method of claim 4, wherein said determining a clash exists comprises:
   determining a first name for said first file matches a second name for said second file; and
   determining said bit pattern for said first file matches said corresponding bit pattern for said second file.

6. The computer implemented method of claim 1, wherein said merging further comprises:
   determining a clash exists between said first file in said first volume and said second file in said second volume;
   determining that said first and second files are wanted;
   renaming said first file;
   renaming said second file; and
   merging both said first file and said second file into said merged volume.

7. The computer implemented method of claim 6, wherein said determining a clash exists further comprises:
   determining a first name for said first file matches a second name for said second file; and
   determining that said bit pattern for said first file does not match said corresponding bit pattern for said second file.

8. The computer implemented method of claim 1, further comprising:
   determining no clash exists between said first file in said first volume and any files in said second volume; and
   merging said first file into said merged volume.

9. A computer system comprising:
   a processor; and
   memory coupled to said processor and having stored therein instructions that, if executed by said computer system, cause said computer system to execute a method for storing comprising:
   creating one or more snapshots of one or more volumes of a first system;
   determining if a clash exists between a first file in a first volume and a second file in a second volume, wherein said determining comprises determining if a first identifier for said first file matches a second identifier for said second file, wherein said determining further comprises determining if a bit pattern for said first file matches a corresponding bit pattern for said second file;
   merging files in said one or more snapshots into a merged volume, wherein said merging comprises determining which of said first file and said second file are wanted, wherein said merging further comprises merging only wanted files in said merged volume;
   calculate a size of said merged volume based at least in part on clashing between said files; and
   storing said merged volume in a second system based upon the size of said merged volume;
   wherein a first file format of said first system is different from a second file format of said second system, and wherein files of the first system are synchronized with files of the second system.

10. The computer system of claim 9, wherein said method further comprises:
    storing said one or more snapshots in a backup system;
    said storing said merged volume further comprising mounting said merged volume in accordance with a selected file format in said second system; and
    said storing said merged volume further comprising copying merged files from said one or more snapshots to said mounted, merged volume.

11. The computer system of claim 9, wherein said merged volume comprises a backup volume to said first system, and wherein said method further comprises:
    mounting a second merged volume according to a selected file format in a third system; and
    copying files from said merged volume to said second merged volume.

12. The computer system of claim 9, wherein said method further comprises:
    determining no clash exists between said first file in said first volume and any files in said second volume; and
    merging said first file into said merged volume.

13. The computer system of claim 9, wherein in said method said merging further comprises:
    determining a clash exists between said first file in said first volume and said second file in said second volume;
    determining said first file is unwanted such that said first file is not merged into said merged volume; and
    merging said second file in said merged volume.

14. The computer system of claim 13, wherein in said method said determining a clash exists comprises:
    determining a first name for said first file matches a second name for said second file; and
    determining said bit pattern for said first file matches said corresponding bit pattern for said second file.

15. The computer system of claim 9, wherein in said method said merging further comprises:
    determining a clash exists between said first file in said first volume and said second file in said second volume;
    determining that said first and second files are wanted;
    renaming said first file;
    renaming said second file; and
    merging both said first file and said second file into said merged volume.

16. A non-transitory computer-readable storage medium having computer executable instructions for causing a computer system to perform a method for storing comprising:
    creating one or more snapshots of one or more volumes of a first system;
    determining if a clash exists between a first file in a first volume and a second file in a second volume, wherein said determining comprises determining if a first identifier for said first file matches a second identifier for said second file, wherein said determining further comprises determining if a bit pattern for said first file matches a corresponding bit pattern for said second file;
    merging files in said one or more snapshots into a merged volume, wherein said merging comprises determining which of said first file and said second file are wanted, wherein said merging further comprises merging only wanted files in said merged volume;
    calculating a size of said merged volume based at least in part on clashing between said files; and
    storing said merged volume in a second system based upon the size of said merged volume;
    wherein a first file format of said first system is different from a second file format of said second system, and wherein files of the first system are synchronized with files of the second system.

17. The non-transitory computer-readable storage medium of claim 16, wherein said method further comprises:
    storing said one or more snapshots in a backup system;
    said storing said merged volume further comprising mounting said merged volume in accordance with a selected file format in said second system; and
    said storing said merged volume further comprising copying merged files from said one or more snapshots to said mounted, merged volume.

18. The non-transitory computer-readable storage medium of claim 16, wherein said merged volume comprises a backup volume to said first system, and said method further comprises:
    mounting a second volume according to a selected file format in a third system; and
    copying files from said merged volume to said second volume.

19. The non-transitory computer-readable storage medium of claim 16, wherein in said method said merging further comprises:
    determining a clash exists between said first file in said first volume and said second file in said second volume;
    determining said first file is unwanted such that said first file is not merged into said merged volume; and
    merging said second file in said merged volume.

20. The non-transitory computer-readable storage medium of claim 16, wherein in said method said merging further comprises:
    determining a clash exists between said first file in said first volume and said second file in said second volume;
    determining that said first and second files are wanted;
    renaming said first file;
    renaming said second file; and
    merging both said first file and said second file into said merged volume.

* * * * *